(12) United States Patent
Seo

(10) Patent No.: US 12,009,479 B1
(45) Date of Patent: Jun. 11, 2024

(54) ROLL-TO-ROLL FORMATION METHOD FOR SOLID ELECTROLYTE USING METAL COLLOIDAL PARTICLES

(71) Applicant: BEILab corp., Ansan-si (KR)

(72) Inventor: Jihyun Seo, Suwon-si (KR)

(73) Assignee: BEILAB CORP., Ansan-si (KR)

( * ) Notice: Subject to any disclaimer, the term of this patent is extended or adjusted under 35 U.S.C. 154(b) by 0 days.

(21) Appl. No.: 18/558,539

(22) PCT Filed: Jun. 8, 2022

(86) PCT No.: PCT/KR2022/008077
§ 371 (c)(1),
(2) Date: Nov. 2, 2023

(87) PCT Pub. No.: WO2022/260427
PCT Pub. Date: Dec. 15, 2022

(30) Foreign Application Priority Data

Jun. 10, 2021 (KR) .......................... 10-2021-0075447

(51) Int. Cl.
*H01M 10/0562* (2010.01)
(52) U.S. Cl.
CPC ................. *H01M 10/0562* (2013.01); *H01M 2300/0068* (2013.01)

(58) Field of Classification Search
CPC .................. H01M 10/0562; H01M 2300/0068
See application file for complete search history.

(56) References Cited

U.S. PATENT DOCUMENTS

2015/0364747 A1 12/2015 Elam et al.
2020/0243834 A1 7/2020 Ban et al.

FOREIGN PATENT DOCUMENTS

| JP | 2018200827 A | 12/2018 |
|---|---|---|
| KR | 10-2014-0088203 A | 7/2014 |
| KR | 10-2015-0067237 A | 6/2015 |
| KR | 10-2016-0020280 A | 2/2016 |
| KR | 10-1984408 B1 | 5/2019 |
| KR | 10-2088648 B1 | 3/2020 |
| KR | 10-2020-0143270 A | 12/2020 |
| KR | 10-2193945 B1 | 12/2020 |

*Primary Examiner* — Jane J Rhee
(74) *Attorney, Agent, or Firm* — NKL LAW; Jae Youn Kim

(57) ABSTRACT

The present invention relates to a roll-to-roll formation method for a solid electrolyte using metal colloidal particles and, more specifically, to a roll-to-roll formation method for a solid electrolyte using metal colloidal particles, wherein the method enables design of a solid electrolyte material with a desired composition by means of direct coating of metal colloidal particles on a metal electrode foil, and enables formation of a void-free sulfide-based solid electrolyte material by sequentially inducing, on a solid electrolyte forming layer, a sulfurization reaction by a roll-to-roll method without a complicated powder processing process.

3 Claims, 3 Drawing Sheets

```
┌─────────────────────────┐
│ METAL COLLOIDAL PARTICLES│
└────────────┬────────────┘
             ▼
┌─────────────────────────────────────────────────────────────┐
│ STEP OF DIRECTLY COATING METAL ELECTRODE FOIL WITH METAL    │
│ COLLOIDAL PARTICLES TO FORM SOLID ELECTROLYTE LAYER         │
└─────────────────────────────┬───────────────────────────────┘
                              ▼
┌─────────────────────────────────────────────────────────────┐
│ STEP OF SUPPLYING SULFUR SOURCE TO SOLID ELECTROLYTE LAYER  │
│ TO INDUCE SULFIDATION REACTION, THEREBY FORMING SULFIDE-    │
│ BASED SOLID ELECTROLYTE LAYER                               │
└─────────────────────────────────────────────────────────────┘
```

ROLL-TO-ROLL FORMATION METHOD FOR SOLID ELECTROLYTE USING METAL COLLOIDAL PARTICLES

TECHNICAL FIELD

The present invention relates to a roll-to-roll formation method of a solid electrolyte using metal colloidal particles, and more particularly to a method of coating a metal electrode foil (a positive electrode plate or a negative electrode plate) with metal colloidal particles and sequentially inducing sulfidation reaction using a roll-to-roll method to form a sulfide-based solid electrolyte.

BACKGROUND ART

A secondary battery, which is a battery that can be semi-permanently used through repeated charging and discharging, means a device that converts external electrical energy into chemical energy, stores the chemical energy, and generates electricity using the chemical energy when needed. Four core materials of the secondary battery are a positive electrode material, a negative electrode material, a separator, and an electrolyte.

A lithium-ion battery, which is a representative secondary battery, has the advantage of being smaller in weight and volume than other batteries of the same capacity and having higher output than ordinary batteries. The lithium-ion battery is rapidly growing from a small battery market to an electric vehicle and medium and large markets, is applicable as a core technology for future industries, and has the potential to expand into various industries.

Since the lithium-ion battery, which is a general secondary battery, uses a liquid electrolyte containing an organic solvent, however, there are various problems related to stability of the battery, such as leakage, impact, ignition, and explosion caused by use of the organic solvent.

As a result, an all-solid-state battery, in which the liquid electrolyte, which is one component of the conventional lithium-ion battery, is replaced with a solid electrolyte, is attracting attention as a next-generation secondary battery. The all-solid-state battery has the advantage of significantly reducing a risk of fire and explosion as the result of using the solid electrolyte, having a wide application range, being manufactured through a simplified manufacturing process, and having high energy density.

The conventional all-solid-state battery has the problem of undergoing complex processes, such as synthesis of sulfide powder having a desired composition, electrode coating, rolling, and heat treatment, in order to form the solid electrolyte, which is a core component of the all-solid-state battery.

In particular, (1) it is difficult to densify pre-synthesized ceramic particles without voids in a process of densifying sulfide powder, and (2) it is difficult for the pre-synthesized ceramic particles to form a homogeneous interface with particles constituting a positive electrode and a negative electrode.

PRIOR ART DOCUMENTS

Korean Registered Patent No. 10-2088648
Korean Registered Patent No. 10-2193945

DISCLOSURE

Technical Problem

It is an object of the present invention to provide a roll-to-roll formation method of a solid electrolyte using metal colloidal particles, wherein a metal electrode foil is directly coated with metal colloidal particles to design a solid electrolyte material having a desired composition and sequential sulfidation reaction is induced using a roll-to-roll method without a complex powder processing process to form a void-free sulfide-based solid electrolyte material.

Technical Solution

In order to accomplish the above object, the present invention provides a roll-to-roll formation method of a solid electrolyte using metal colloidal particles, the roll-to-roll formation method including:
(a) directly coating a metal electrode foil with metal colloidal particles to form a solid electrolyte layer; and
(b) supplying a sulfur source to the solid electrolyte layer formed in step (a) to induce sulfidation reaction, thereby forming a sulfide-based solid electrolyte layer.

In the direct coating step of forming the solid electrolyte layer, the metal colloidal particles may be colloidal particles constituted by at least one of copper (Cu), lithium (Li), germanium (Ge), phosphorus (P), silicon (Si), sodium (Na), molybdenum (Mo), lanthanum (La), or zirconium (Zr) single metal particles and alloy metal particles selected from the group consisting of combinations thereof.

In the step of inducing sulfidation reaction to form the sulfide-based solid electrolyte layer, the sulfur source may include at least one of hydrogen sulfide ($H_2S$), sulfur gas (S vapor), and methyl mercaptan ($CH_3SH$), and may be supplied through continuous or pulse-like supply of gas.

Advantageous Effects

In a roll-to-roll formation method of a solid electrolyte using metal colloidal particles according to an embodiment of the present invention, a metal electrode foil is directly coated with single metal colloidal particles, such as copper or lithium, or metal alloy colloidal particles, whereby it is possible to design a solid electrolyte material having a desired composition.

In addition, sulfidation reaction is sequentially induced on a solid electrolyte formation layer using a roll-to-roll method without a complex powder processing process, whereby it is possible to form a void-free sulfide-based solid electrolyte material.

BEST MODE

Hereinafter, the present invention will be described in more detail.

An embodiment of the present invention relates to a roll-to-roll formation method of a solid electrolyte using metal colloidal particles, the roll-to-roll formation method including:

directly coating a metal electrode foil with metal colloidal particles to form a solid electrolyte layer (e.g. step (a)); and supplying a sulfur source to the solid electrolyte layer formed in the above step to induce sulfidation reaction, thereby forming a sulfide-based solid electrolyte layer (e.g. step (b)).

Specifically, in the method of the present invention, an electrode is directly coated with metal colloidal particles to form a solid electrolyte layer, and a sulfur source is sequentially supplied using a roll-to-roll method after the electrode is directly coated with the metal colloidal particles to form a sulfide-based solid electrolyte. In addition, it is possible to minimize voids at an electrode-metal particle interface or voids between the metal particles that may occur.

In the roll-to-roll method, a material is applied, coated, or printed while the material is wound around a rotating roll in an electrode process. According to the roll-to-roll method, the material may be transferred from one roll to the other through the rotation of a pair of rolls spaced apart from each other by a predetermined distance.

Roll-to-roll technology is becoming increasingly important in the secondary battery industry due to the advantage of large area and process simplification. In the present invention, an electrode is coated with metal colloidal particles through sequential processes using the roll-to-roll method, and a sulfur source is sequentially supplied to a metal colloidal solid electrolyte layer formed by coating to form a sulfide-based solid electrolyte with minimized voids.

Figure 1:
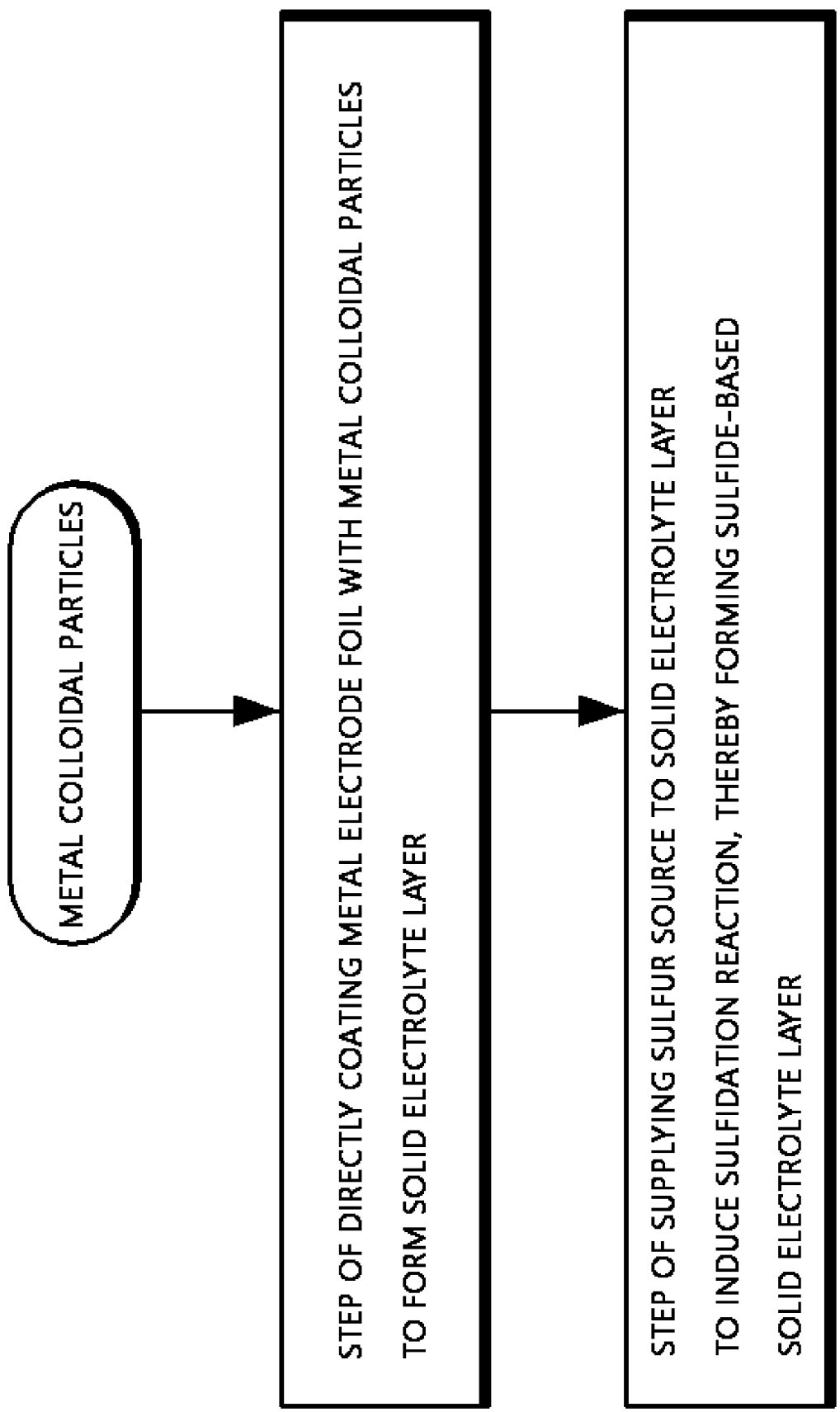
FIG. 1 is a flowchart showing a roll-to-roll formation method of a solid electrolyte using metal colloidal particles according to an embodiment of the present invention.
Figure 2:
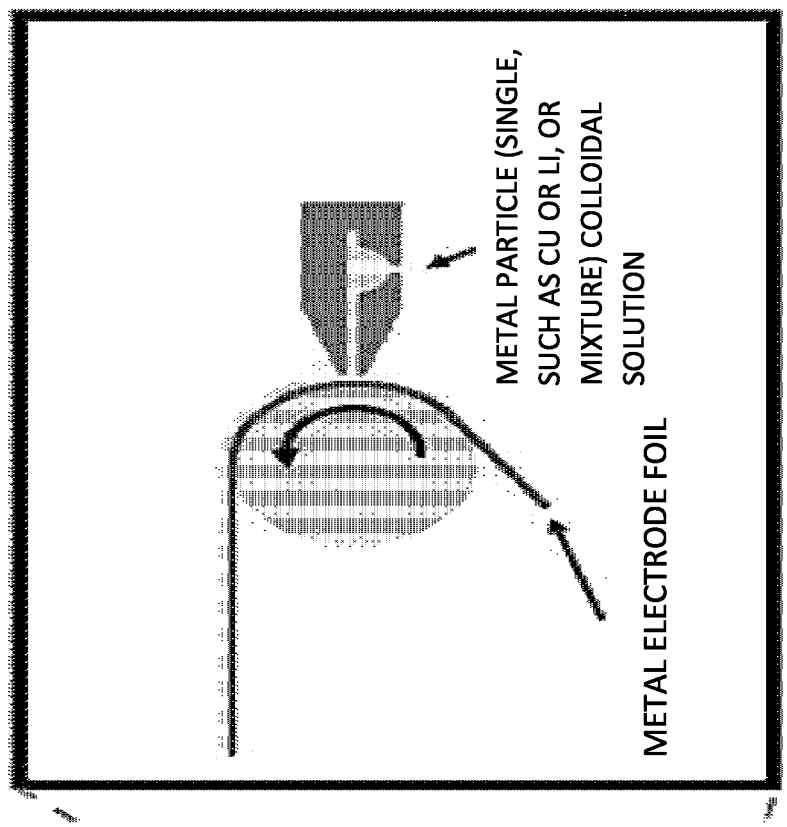
FIG. 2 is a view showing a process of directly coating a metal electrode foil with metal colloidal particles according to an embodiment of the present invention.
Figure 2:
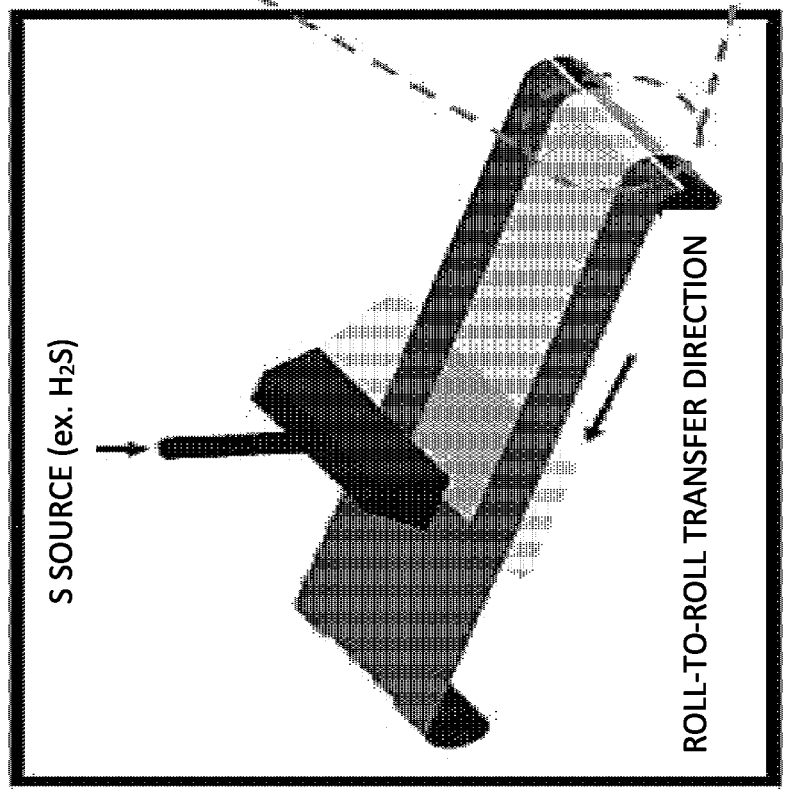
Figure 3:
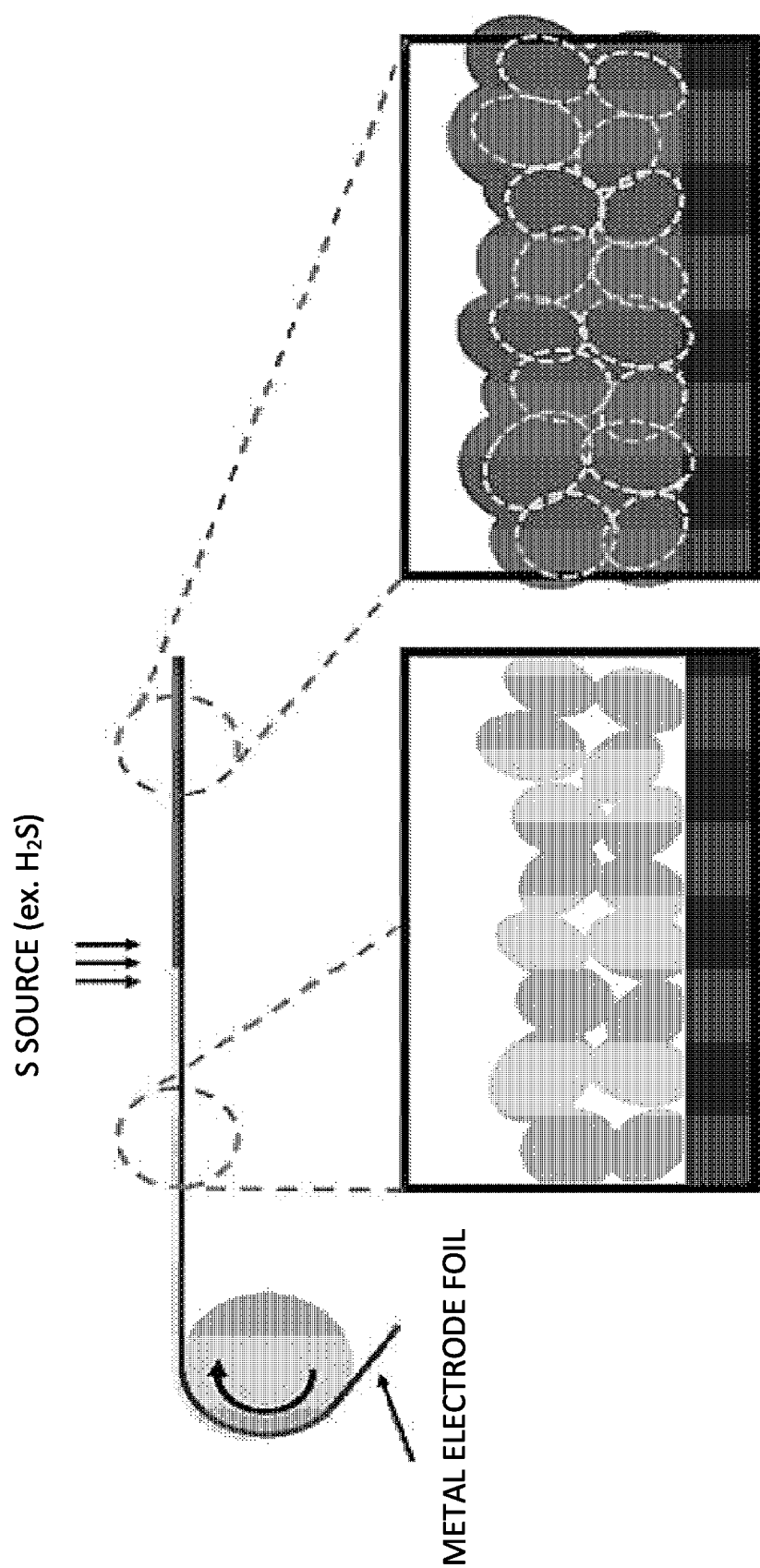
FIG. 3 is a view showing a process of supplying a sulfur source to a solid electrolyte formation layer formed on a metal electrode foil by coating to induce sequential sulfidation reaction according to an embodiment of the present invention.

Referring to FIG. 2, in step (a), a particle supply unit 300 configured to supply metal colloidal particles toward one of a pair of rolls 210 and 220 configured to transfer a metal electrode foil 100 may be disposed at a position spaced apart from one of the pair of rolls 210 and 220. For example, the particle supply unit 300 may be disposed in the vicinity of the right roll 210, which is one of the pair of rolls 210 and 220 shown in FIG. 2. Here, one roll (i.e. the right roll in FIG. 2) may mean a roll from which transfer of the metal electrode foil 100 is started, and the other roll (i.e. the left roll in FIG. 2) may mean a roll from which transfer of the metal electrode foil 100 is ended. That is, the metal electrode foil 100 may be transferred from one roll, which is one of the pair of rolls 210 and 220 spaced apart from each other, to the other roll.

In step (a), the metal electrode foil 100 passing by one of the pair of rolls may be coated with metal colloidal particles supplied through the particle supply unit 300. That is, metal colloidal particles may be supplied toward one of the pair of rolls (the right roll in FIG. 2) through the particle supply unit, and the part of the metal electrode foil passing by one of the pair of rolls may be coated with the metal colloidal particles, whereby a solid electrolyte layer may be formed.

In step (b), a sulfur source may be sequentially supplied in a longitudinal direction of the metal electrode foil 100 when the metal electrode foil 100 is transferred in a roll-to-roll manner. Specifically, a sulfur source supply unit 400 configured to supply the sulfur source may be installed above the metal electrode foil 100 that is transferred (i.e. from the solid electrolyte layer on the metal electrode foil) so as to be spaced apart therefrom. That is, as shown in FIG. 2, the sulfur source supply unit 400 may be disposed in a direction perpendicular to a direction in which the pair of rolls is spaced apart from each other. At this time, the sulfur source supply unit 400 may be disposed above an imaginary line connecting the pair of rolls so as to be spaced apart therefrom.

A sulfur source may be sprayed downwards from the sulfur source supply unit 400. That is, the metal electrode foil continuously moved between the pair of rolls 210 and 220 (i.e. the metal electrode foil on which the solid electrolyte layer is formed) may pass by under the sulfur source supply unit 400. At this time, the sulfur source may be continuously sprayed toward the metal electrode foil 100 passing under the sulfur source supply unit 400.

More specifically, when the metal electrode foil 100 coated with the metal colloidal particles and thus having the solid electrolyte layer formed thereon is transferred from one of the pair of rolls 210 and 220 toward the other, the sulfur source may be sprayed toward the solid electrolyte layer on the metal electrode foil 100 through the sulfur source supply unit 400 in step (b).

Step (a) and step (b) may be sequentially and continuously performed.

A colloidal electrolyte having single metal particles or metal alloy particles, such as the metal colloids of the present invention, introduced thereinto has the advantage of simplifying the design of a solid electrolyte because the properties of the interface can be directly controlled. The solid electrolyte is classified as an organic (polymer) electrolyte and an inorganic electrolyte. A colloidal electrolyte, such as the metal colloids of the present invention, may be classified as an inorganic electrolyte.

The metal colloidal particles may be colloids constituted by at least one of copper (Cu), lithium (Li), germanium (Ge), phosphorus (P), silicon (Si), sodium (Na), molybdenum (Mo), lanthanum (La), or zirconium (Zr) single metal particles and alloy metal particles selected from the group consisting of combinations thereof.

The metal colloidal particles may include chlorine (Cl), magnesium (Mg), and sodium (Na) for the purposes of dispersibility and doping, and may be used with molecules such as polyethylene oxide (PEO), polyacrylonitrile (PAN), polyvinylidene difluoride (PVDF), and polymethyl methacrylate) (PMMA); however, the present invention is not limited thereto.

A dispersant that can be used to form the colloidal electrolyte may include, but is not limited to, a single solvent, such as fluoroethylene carbonate (FEC), poly(ethylene glycol) (PEG), dimethylsulfoxide (DMSO), ethylene carbonate (EC), propylene carbonate (PC), diethyl carbonate (DEC), or dimethyl carbonate (DMC), or a mixture thereof.

In the embodiment of the present invention, the sulfur source includes at least one of hydrogen sulfide ($H_2S$), sulfur gas (S vapor), and methyl mercaptan ($CH_3SH$), and is supplied through continuous or pulse-like supply of gas. The sulfur source is sequentially supplied to the solid electrolyte layer, formed by directly coating the metal electrode foil with the metal colloidal particles, through continuous or pulse-like supply of gas, whereby sulfidation reaction is induced to form a sulfide-based solid electrolyte.

In the embodiment of the present invention, the sulfur source may include thiol-containing molecules including a thiol group.

In the embodiment of the present invention, the metal electrode foil may be heated to a temperature ranging from room temperature to 500° ° C. when the sulfur source is supplied depending on the type of metal colloids. The metal electrode foil may be pre-heated by a separate heating element, or may be heated by heating of one of the pair of rolls.

It is possible to reduce sulfidation reaction by supplying a sulfur source to a metal colloidal solid electrolyte layer formed on a metal electrode foil by direct coating without the hassle of primarily synthesizing sulfide powder having a desired composition and coating an electrode therewith, performing a process using a high-energy ball mill in order to secure composition and crystallinity of the sulfide powder, or going through complex processes, such as rolling and heat treatment, in order to form a solid electrolyte, as in the prior art.

Although the specific details of the present invention have been described in detail, a person having ordinary skill in the art to which the present invention pertains will appreciate that the detailed description thereof discloses only preferred embodiments of the present invention and thus does not limit the scope of the present invention. It will be possible for a person having ordinary skill in the art to which the present invention pertains to make various applications and modifications within the scope of the invention based on the above description.

Accordingly, the substantial scope of the present invention is defined by the appended claims and equivalents thereto.

The invention claimed is:

1. A roll-to-roll formation method of a solid electrolyte using metal colloidal particles, the roll-to-roll formation method comprising:
    (a) directly coating a metal electrode foil with the metal colloidal particles to form a solid electrolyte layer; and
    (b) supplying a sulfur source to the solid electrolyte layer formed in step (a) to induce sulfidation reaction, thereby forming a sulfide-based solid electrolyte layer.

2. The roll-to-roll formation method according to claim 1, wherein the metal colloidal particles comprise at least one of copper (Cu), lithium (Li), germanium (Ge), phosphorus (P), silicon (Si), sodium (Na), molybdenum (Mo), lanthanum (La), or zirconium (Zr) single metal particles and alloy metal particles selected from a group consisting of combinations thereof.

3. The roll-to-roll formation method according to claim 1, wherein
    the sulfur source comprises at least one of hydrogen sulfide ($H_2S$), sulfur gas (S vapor), and methyl mercaptan ($CH_3SH$), and is supplied through continuous or pulse-like supply of gas.

* * * * *